United States Patent [19]

Gogarty

[11] Patent Number: 5,199,836

[45] Date of Patent: Apr. 6, 1993

[54] T-NUT

[76] Inventor: Brian J. Gogarty, 385 S. Liberty, Elgin, Ill. 60120

[21] Appl. No.: 867,344

[22] Filed: Apr. 13, 1992

[51] Int. Cl.$^5$ .................. F16B 27/00; F16B 37/00
[52] U.S. Cl. .................................. 411/84; 411/104; 411/553
[58] Field of Search .................. 411/84, 85, 104, 427, 411/549, 551, 553, 546; 403/389, 390, 406.1, 408.1

[56] References Cited

U.S. PATENT DOCUMENTS

| | | | |
|---|---|---|---|
| 3,908,330 | 9/1975 | Frach et al. | 403/408.1 |
| 4,575,295 | 3/1986 | Rebentisch | 411/85 |
| 4,784,554 | 11/1988 | Break | 411/85 |
| 4,830,531 | 5/1989 | Condit et al. | 411/85 |
| 4,840,525 | 6/1989 | Rebentisch | 411/104 X |
| 5,076,748 | 12/1991 | Waterfield et al. | 411/551 |

Primary Examiner—Neill R. Wilson
Attorney, Agent, or Firm—Paul H. Gallagher

[57] ABSTRACT

A T-nut having a lower head, and an upper shank, the shank fitting in the narrow portion of the T-slot. The head and the shank have chamfers and radiuses enabling the T-nut to be rotated in the T-slot, into active/locking position. On the shank, the radiuses dimensioned for either clearance or interference fit with the sides of the slot. In a second form, a locking washer positively locks the T-nut in active position. Also included is an arrangement of spacers and T-nuts for mounting a drill through plate on the table of the milling machine.

10 Claims, 3 Drawing Sheets

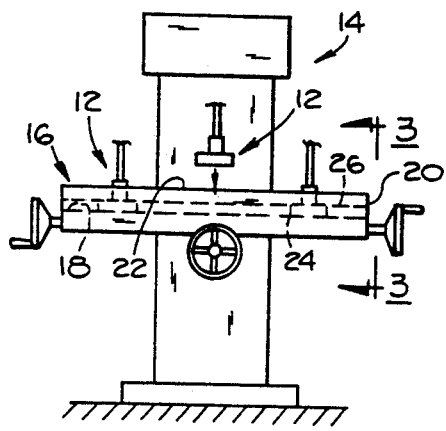
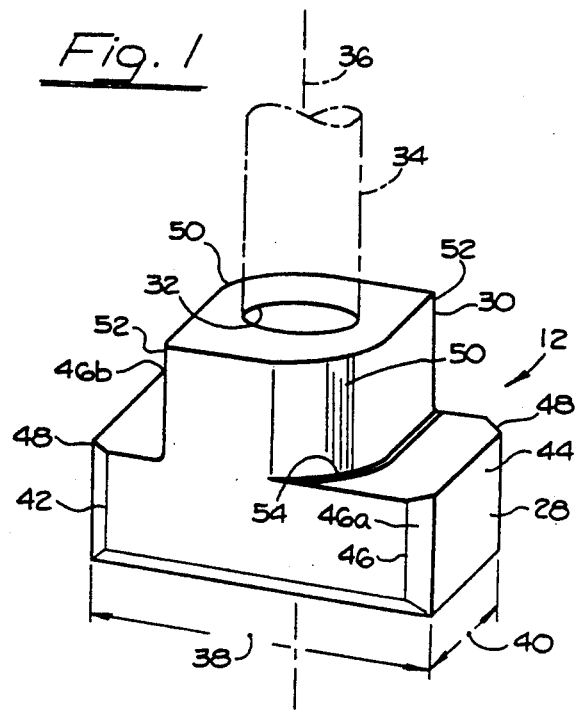
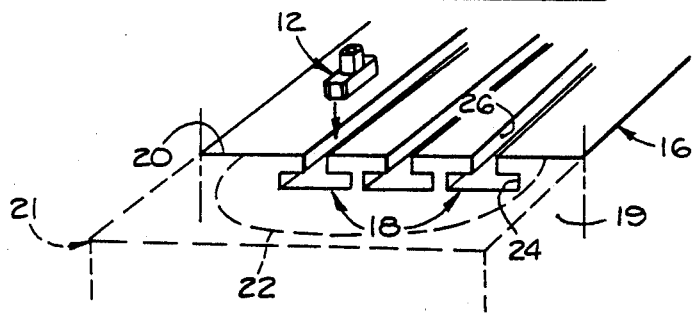
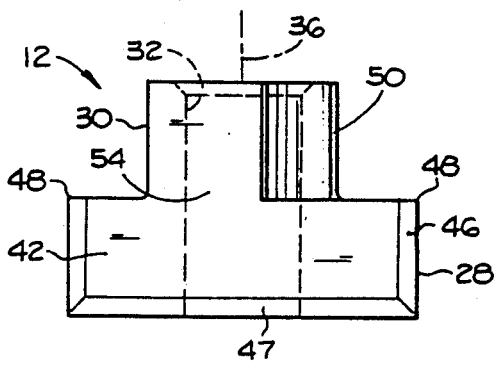 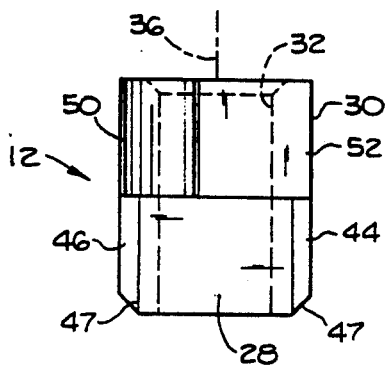

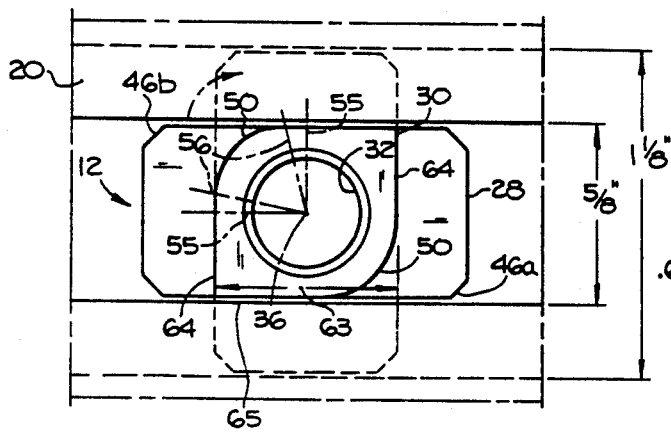
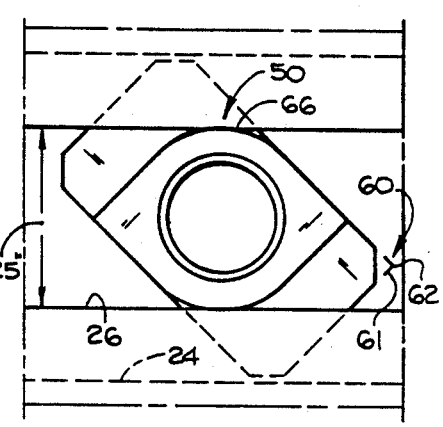
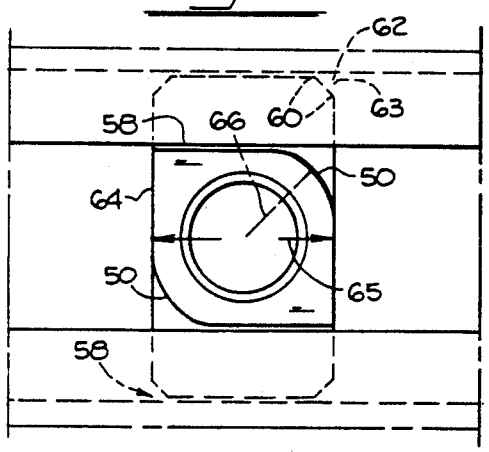
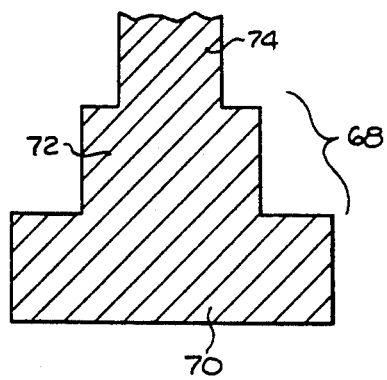
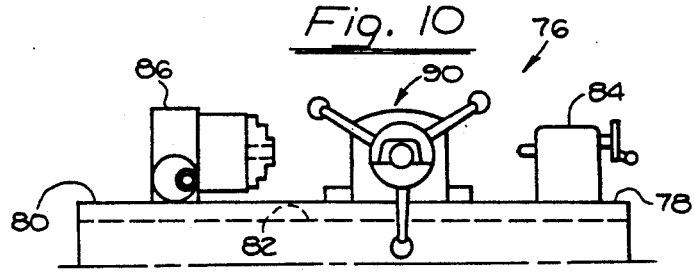

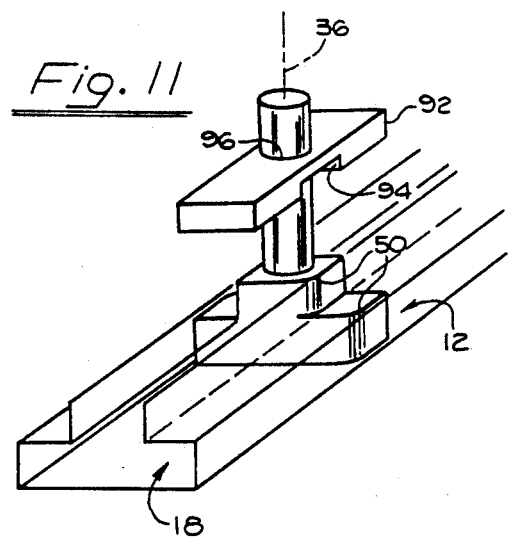
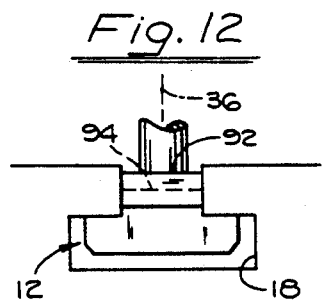
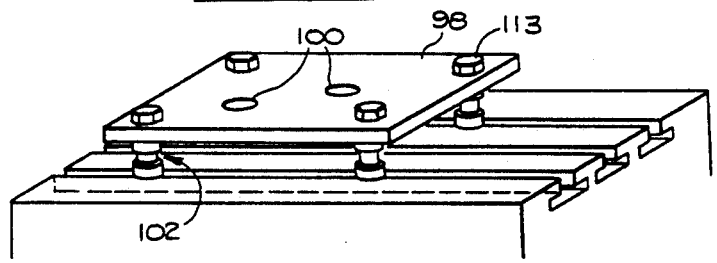
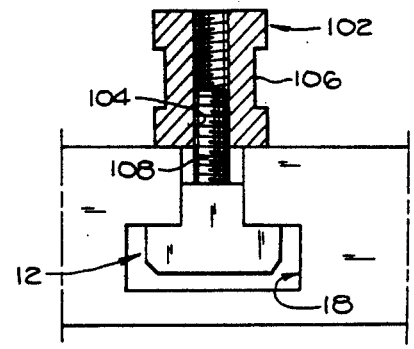
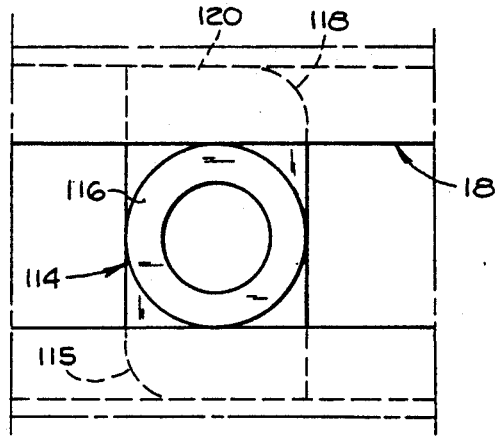
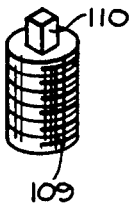

T-NUT

BRIEF SUMMARY OF THE INVENTION

The invention resides in the field of machining industry, having to do directly with machines with tables having T-slots therein, including for example milling machines, boring bar tables. The T-nut is placed in the T-slot and a rod is directed upwardly for mounting a support, tool, etc.

Reference is made to Rebentisch U.S. Pat. No. 4,575,295, dated Mar. 11, 1986.

In such machines in the practice heretofore, it was necessary to insert the T-nuts into the T-slot from the open end of the T-slot, which opens through the end of the table. In such use, heretofore, in order to insert another T-nut along the length of the table, inwardly of a previously mounted T-nut, it was necessary to first remove the previous T-nut, then slide the present one in, and then again slide in the previous T-nut. Such handling of the T-nuts of course was time consuming and it was extremely difficult in assuring that all previously mounted T-nuts were again mounted in accurate positions, and in the same accurate position as mounted theretofore.

A main object of the present invention is to provide a T-nut of specific design and construction to enable it to be inserted into a T-slot directly perpendicular into the slot, rather than through an open end of the latter, and in such a situation rendering it unnecessary to remove, or even distrub, previously mounted T-nuts.

An important feature of the invention is that the T-nut, because of its design and construction enabling it to be inserted perpendicularly into the T-slot, provides a novel locking effect eliminating or minimizing accidental dislodgement from its locked position.

An additional feature is a novel means for positively locking the T-nut in position in the T-slot.

BRIEF DESCRIPTION OF THE SEVERAL VIEWS OF THE DRAWINGS

FIG. 1 is a perspective view of a T-nut embodying the features of the invention.

FIG. 2 is a semi-diagrammatic view of a milling machine of the kind in which the T-nuts of the invention are mounted, also showing the T-nuts.

FIG. 3 is a semi-diagrammatic view of the end of the machine table of FIG. 2, oriented according to line 3—3 of FIG. 2.

FIG. 4 is a side view of the T-nut.

FIG. 5 is an end view.

FIG. 6 is a top view of a portion of the table of the machine, with the T-nut in position in the first step in inserting it into the T-slot.

FIG. 7 is a view similar to FIG. 6, but with the T-nut turned a quarter turn to active or locking position.

FIG. 8 is a view showing an intermediate position of the T-nut.

FIG. 9 is a cross-sectional view of the T-nut formed integral with a mounting rod.

FIG. 10 is a semi-diagrammatic view of a milling table with an additional component mounted between other components previously set in position.

FIG. 11 is a fragmentary perspective view of a locking member in association with the T-nut.

FIG. 12 is a fragmentary end view, from the lower left of FIG. 11, with the locking member in lower locking position.

FIG. 13 is a fragmentary perspective view of a drill through plate mounted on the table, by means of the T-nut of the invention.

FIG. 14 is a fragmentary perspective view of a riser of FIG. 13 mounted by means of the T-nut.

FIG. 15 is a fragmentary perspective view of a modified form of bolt of the kind incorporated in FIG. 14.

FIG. 16 is a view similar to FIG. 15 of another form of bolt.

FIG. 17 is a view oriented according to FIG. 6 of an alternate form of T-nut.

DETAILED DESCRIPTION

The T-nut of the invention is shown in its entirety at 12, in FIG. 1, the details being described hereinbelow. For convenience in describing the character and functioning of the T-nut of the invention, reference is first made to FIG. 2 which shows in semi-diagrammatic form a milling machine 14 of known character. The milling machine includes a table 16 for mounting a work piece thereon. This table has one or more T-slots 18, usually three, which open out through the end of the table indicated at 19, and open up through the top surface 20 of the table. The end of the table, at 19, is shown without details, for convenience, but as represented diagrammatically in FIG. 3, the table includes a terminal portion 21 which includes an opening 22 enabling insertion of the T-bolts into the slots.

As indicated, the machine shown in FIG. 2 is a milling machine and provides background for the device of the invention; the T-nut may be used in various kinds of machines, such as Bridgeport milling machine, Boring bar tables, Horizontal milling machine tables, etc. In all cases, the T-slots are similar, and arranged in a similar manner, opening out through the ends of the table and through the top surface thereof.

The different elements or portions of the T-slots in the various machines may be of various dimensions, and the T-nuts are dimensioned correspondingly thereto, this relationship being referred to again hereinbelow. As an example of specific dimensions involved, the following dimensions are given for convenience in realizing the relationship involved, but Applicant of course is not limited to such dimensions. Each T-slot (FIG. 3) includes a lower wide portion 24, and an upper narrow portion 26. The width of the lower portion of the T-slot in the present case, is 1 ¼", while the width of upper narrow portion 26 is ⅝".

The T-nut 12 of the invention (FIG. 1), is dimensioned generally according to those dimensions, but with slight variations as described hereinbelow. The T-nut 12 has a lower large portion 28, also referred to as a head, and an upper small portion 30, also referred to as a shank. The T-nut is of one piece, integral, and is provided with a tapped hole 32 into which is threaded a mounting rod 34. For purposes of convenience, the description of the T-nut, and various other elements and members with which it is associated, are described as oriented in FIG. 1, having a central vertical axis 36. Similar reference will be made to the milling machine of FIG. 2, being described as oriented in that figure as having upper and lower directions. It will be understood that the various elements may be in other positions or orientations, instead, and the description should be interpreted accordingly.

The head 28 of the T-nut has a generally rectangular outline shape, as viewed vertically, having a length direction and dimension 38, and a width direction and dimension 40. The head therefore has long side surfaces 42, and short end surfaces 44, and it has flat top surfaces extending beyond the shank. The head at the corners is chamfered at 46, of a dimension referred to hereinbelow. Two of the chamfers, 46a, 46b, diagonally disposed, provide clearance in the locking step, and the other two are provided to avoid obstruction by loose chips, and they present a symmetrical appearance. Also chamfers 47 are formed on the side surfaces, to avoid obstruction by loose chips and aid in entry into the slot.

The shank 30 is of basic square shape, as viewed downwardly. At two of the corners of the shank are curves 50, which are commonly referred to as radiuses, but which may also be referred to as chamfers, dimensions of which are referred to again hereinbelow, and at the other two corners, diagonally arranged, the sides converge to form square corners 52.

The T-nut may be provided with a groove or small radius 54 to accommodate burrs that may be in the T-slots, and to maintain the integrity of the T-nut.

The central vertical axis 36 is shown in FIG. 6, as are radial lines 55, at 90° angular spacing. Other radial lines 56 are shown, that are at an angular spacing of less than 90°, these latter being utilized as reference marks in connection with the radiuses 50, as referred to below.

In the use of the T-nut, it is mounted on the supporting rod 34, and the T-nut is inserted in the T-slot, the supporting rod serving as a means for supporting a work piece, clamping an article, etc., in a known manner. The T-nut is dimensioned so that the head 28 thereof, in active or locked position, extends transversely of the T-slot (FIG. 7) and in such position it can be slid along the T-slot, the various dimensions being such as to enable this sliding action. When the T-nut is in the slot, the shank extends upwardly through the narrow portion of the T-slot (FIG. 2).

In the present case, where the wide bottom portion of the slot is assumed to be 1¼" wide, the length of the head 28 of the T-nut is dimensioned less than that, in this case 1" in length (38), leaving a space at 58 (FIG. 7) at each end of approximately ⅛". This provides a free sliding fit so that when the T-nut is in active position, it can readily and easily be slid along the T-slot by the operator in setting up the machine. These relative dimensions between the head and the side surfaces of the slot are of course representative, and not limiting.

The chamfers 46 on the head 28, in the present example, may be 1/16" on edge (FIG. 8), i.e., each corner 60 is positioned 1/16", indicated at 61, from the projected intersection at 62.

In the present case, in the assumed dimensions of the elements, the dimension 63 of the shank 30 (FIG. 6) between the flat sides 64 lying in the outline of the basic square figure, is approximately 0.600-0.622", the upper portion 26 of the slot being ⅝", or 0.625". This provides a slip fit, or approximately 0.002"-0.003" undersize, the location of these mating surfaces being indicated at 65 in FIG. 6. The curved surfaces or radiuses 50 referred to in connection with FIG. 1, appear also in FIGS. 6-8. These radiuses are preferably dimensioned size-on-size relative to the slot, but may be up to 0.001" oversize forming an interference fit. The radial lines 56, of the radiuses 50, being longer than one-half the dimension 63, have angular spacing less than that of the radial lines 55 as referred to above.

In the use of the T-nut of the invention, it is put in place as indicated in FIG. 3. To insert it into place, it is positioned with its length dimension extending along the length of the T-slot in the position shown in full lines in FIG. 6. The head 28 slides readily downwardly in the narrow portion of the T-slot into the bottom wide portion, and in this position the shank 30 extends up into the narrow portion of the T-slot, as noted. In this operation the T-nut is first fitted to the supporting rod 34, and the rod is gripped and the device manipulated thereby. After the T-nut is fitted down into the slot as just referred to (FIG. 6) it is turned a quarter turn, clockwise as viewed in this figure, to the position shown in FIG. 7 which is referred to as active or locked position. FIG. 8 shows a position between those of FIGS. 6 and 7, which will be referred to again hereinbelow.

While it was stated hereinabove, that the head is of basic rectangular shape, that shape is modified by the chamfers 46. The head 28, having the dimensions referred to, and as related to the dimensions of the slot, can thus be rotated to its active position, the chamfers 46 being located and dimensioned so to avoid clashing with the side surfaces of the wide portion of the slot. The length dimension 38 of the head, as noted above, is less than the wide portion of the slot, and of such dimension as to enable the rotation referred to. The chamfers 46, and the space between the ends of the head and the side surfaces of the T-slot are of minimal dimensions as to provide maximum area of the head to engage the upper supporting surface of the slot, to provide corresponding maximum interengagement.

The greater dimension of the radiuses or curves 50 relative to the width of the narrow portion of the T-slot, as referred to, provides a semi-locking or deterring effect, against accidental displacement. The fit between the radiuses and the side surfaces of the slot is overcome in the inserting step by applying appropriate turning force on the rod, but it prevents accidental dislodgement, since in normal operation there is no force of sufficient intensity to accidentally dislodge the T-nut. After the radiuses 50 pass by their interference position (FIG. 8), the flat side surface 64, on the corresponding sides, engage, or approach, the corresponding sides surface of the narrow portion of the slot and retain the T-nut in proper position.

It will be understood that the head 28 may be of any suitable depth, i.e. vertical dimension, relative to the depth of the wide portion of the T-slot.

FIG. 9 shows another form of T-nut. In this case the T-nut proper, may be made integral with a supporting rod and together form a T-bolt. In the present case, FIG. 9, a T-bolt is shown similar to the T-nut 68, having a head 70 and a shank 72 which are of one piece i.e., integral, and the two together are integral with the supporting rod 74.

In both cases the T-nut is of great strength, being of one piece construction, and each element thereof being of substantial dimensions in all directions, and the device of FIG. 9 has a further advantage of additional strength in that the T-nut proper is integral with the supporting rod 74.

In the case of the T-nut mounted on a separate rod as in FIG. 1, the rod may be fitted in and secured in the T-nut in the usual manner, such as terminating the threading downwardly to a point short of the bottom so that the rod does not extend through the hole and engage the bottom surface of the T-slot. Also it is practical to extend the hole through the T-slot, and insert a suitable plug of relatively soft material in the bottom against which the supporting rod engages and prevents the supporting rod from extending through the hole.

FIG. 10 shows a milling machine set up for operation, having certain components already set in position. In this case the milling machine is indicated in its entirety at 76 having a table 78 with a top surface 80. The usual T-slots 82 are formed in the table. On the table a tail stock 84 is positioned at one end, and at the other end is a divider head 86.

In such a situation it is often desired to mount another component on a fourth axis, between the first two components 84, 86, such as a vise 90 for performing a function well known. Heretofore, in such a situation it was necessary to remove one of the components 84, 86, to enable insertion of the T-nut on which the vise is mounted. In the case where the components 84, 86 were originally set up, and accurately positioned, after such a step, it was necessary to replace the component that was removed. Again setting up the replaced component was in the least, time consuming, but more seriously, it was difficult to again set it up in the same accurate position it assumed in the original set up.

In the use of the device of the present invention, the components 84, 86, need not be disturbed, but the vise can be put in place between the other components by inserting the T-nut thereon into the T-slot in the manner referred to above. Any adjustments or setting up movements of the vise are performed as desired and necessary, but they do not interfere with the original settings of the first components. The third component, the vise, may be used in an operation on the work piece in conjunction with the first two components, in the original set up, or alone without using those two components, selectively.

Another instance in which the T-nut may be utilized is to set up a stop or fence for use in connection with the operation involved in the original set up.

FIGS. 11 and 12 show a new locking device for use with the T-nut. In these figures the T-nut 12 is shown in the T-slot 18 in active or locking position. In this position the head extends transversely in the large portion of the slot while the shank extends up into the narrow portion of the slot.

Mounted on the rod is an elongated locking washer or bar 92, having a transverse groove 94 in its undersurface and a hole 96 for receiving the rod. The locking washer has a width to fit in the narrow portion of the groove, in a sliding fit, and a length of suitable dimension which may be indeterminate but considerably longer than its width.

When the T-nut is in its active position, the locking washer is fitted down into the narrow portion of the T-slot, against the T-nut, and the groove 94 receives the shank of the T-nut. The locking washer thus is prevented from rotating about the axis 36 of the rod, by means of its engagement with the surfaces of the narrow portion of the slot, and the T-nut is prevented from rotating on that axis by means of the interengagement of the shank thereof in the groove 94.

The locking means of FIGS. 11, 12 provides an added security against accidental rotation of the T-nut, and in fact positively prevents its rotation, and thereby assures its accurate positioning. In this case, the radius (50) is of smaller dimensions than in the other forms.

FIGS. 13, 14 show another feature of the invention. In these figures is shown a drill through plate 98 having holes or openings 100 therethrough. This plate can be mounted on the table of the milling machine, in spaced relation thereabove, and a drill bit in the normal operation extends through the holes 100.

In using this plate 98, it is desired of course that it be accurately parallel with the surface of the table, and to produce that effect, risers 102 are utilized. Each riser is in the form of a heavy steel member, with a tapped hole 104 therethrough, and having wrench flats 106. The risers are mounted on T-nuts, each having a rod or bolt 108, the riser being threaded on the rod.

The riser, with the T-nut, is put in place in a manner similar to that described above, i.e., the T-nut is inserted in the slot perpendicularly thereto, i.e., not through the ends thereof, and the T-nut turned to active or locking position. The riser 102 is then threaded down hard on the rod until it engages the table top.

These risers 102 which may be four in number, thus mounting the plate accurately, and the plate may be put in any of various positions. FIG. 13 shows the T-slots in which the T-nuts are inserted. After the T-nuts and risers are put in place, the plate is fitted on the risers, with hold down nuts or bolts 103 connected with the risers, to hold the plate in place.

FIGS. 15 and 16 show modified forms of bolt 109, 111, similar to the bolt 108 of FIG. 14. Because of the oversize radiuses (50), greater force is required for turning the bolt. The bolt 109 has a boss 110, while the bolt 111 has a socket 112 to which a wrench may be applied, these elements 110, 112, being of suitable noncircular shape, such as square or hex as shown, or of other noncircular shape, such as that known as Torx. Also wrench flats may be provided, instead.

All drill through tables of the general kind shown here (98) are not uniform as to dimensions, accuracy, etc., and consequently it is desired to be able to apply heavy force on the T-nut as in FIG. 14, hence the provision of the elements 110, 112.

While the preferred form of the T-nut is that of FIGS. 1-9, the invention is of such scope as to cover the form of FIG. 17. In the first form (FIGS. 1-9) the shank 30 is utilized to control the position of the T-nut, in coacting with the side surfaces of the narrow portion of the shank. However, if it should be desired, the head may be utilized for this purpose. In FIG. 17, the T-nut, 114, includes a head 115 and a shank 116. The head has radiuses 118 dimensioned for an interference fit with the side surfaces of the wide portion of the T-slot. The end surfaces 120 are undersized relative to those surfaces. In this case, the shank may be cylindrical, as here shown.

I claim:

1. A T-nut for use in a machine tool having an integral mass table with a T-slot therein having a lower wide portion and an upper narrow portion, and further having upper flat surfaces extending from the upper narrow portion to the sides of the lower wide portion, the T-nut comprising, a one-piece, integral, solid member including a lower relatively large head and an upper relatively small shank, the head having a length substantially greater than its width, its length being nearly but less than the width of the lower wide portion of the T-slot, thereby enabling a free sliding fit therein and its width being substantially equal to the width of the upper narrow portion of the T-slot, the T-nut thereby being capable of being inserted into active position in the T-slot by aligning its length with the length of the T-slot and moving it downwardly thereinto in direction perpendicular thereto and turning it substantially a quarter-turn about a vertical axis, when the T-nut is in said active position, the head being positioned in the lower wide portion of the T-slot and the shank being positioned in the upper narrow portion thereof, and the shank being shaped to operably engage the side surfaces of the upper narrow portion of the T-slot to prevent turning the T-nut beyond said quarter-turn, the head having flat top surfaces extending throughout their extent from the shank to their outer ends.

2. A T-nut according to claim 1 wherein, the head has chamfers on at least two diagonally opposite corners to provide maximum length while enabling turning movement.

3. A T-nut according to claim 2 wherein, the head and the shank are of one piece and constitute the whole T-nut, and the T-nut is capable of being secured to a mounting rod extending along said axis.

4. A T-nut according to claim 2 wherein, the head and the shank are of one piece, and they together are of one piece with a mounting rod extending along said axis, thereby constituting a T-bolt.

5. A T-nut according to claim 2 and including, a rod secured to the T-nut, a locking washer of rectangular shape slidable on the rod, the locking washer having a width nearly that of the upper portion of the T-slot, and having a cross groove in the under surface receiving the shank, and the locking washer, by means of its engagement with the side surfaces of the T-slot and the shank of the T-nut, being operable for positively locking the T-nut against turning.

6. A T-nut according to claim 2 wherein, the shank is of basic square shape having side-to-side dimension nearly equal to the width of the upper narrow portion of the T-slot, and the shank has radiuses at diagonally opposite corners operable for enabling said turning of the T-nut.

7. A T-nut according to claim 6 wherein, the shank has a dimension between the radiuses producing an interference fit with the opposed side surfaces of the narrow portion of the T-slot.

8. A T-nut according to claim 7 wherein, said side-to-side dimension of the shank is no greater than the width of the upper narrow portion of the T-slot.

9. A T-nut according to claim 8 wherein, said side-to-side dimension of the shank is slightly less than the width of the upper narrow portion of the slot.

10. Means for mounting a plate on a table having T-slots therein, comprising,

T-nuts in the T-slots with shanks extending upwardly in the T-slots risers on the table secured to respective T-nuts, a plate mounted on the risers, and having holes in line with the risers, and nuts or bolts on the plates secured to the risers, whereby the table is accurately parallel with the table.

* * * * *